(12) United States Patent
Jain et al.

(10) Patent No.: US 10,460,270 B2
(45) Date of Patent: Oct. 29, 2019

(54) SYSTEMS, METHODS, AND APPARATUSES FOR IMPLEMENTING CROSS-ORGANIZATIONAL PROCESSING OF BUSINESS INTELLIGENCE METRICS

(71) Applicant: salesforce.com, Inc., San Francisco, CA (US)

(72) Inventors: Samarpan Jain, Fremont, CA (US); Steven Tamm, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 312 days.

(21) Appl. No.: 14/023,934

(22) Filed: Sep. 11, 2013

(65) Prior Publication Data

US 2014/0074558 A1  Mar. 13, 2014

Related U.S. Application Data

(60) Provisional application No. 61/700,040, filed on Sep. 12, 2012.

(51) Int. Cl.
*G06Q 30/02* (2012.01)
*G06Q 10/06* (2012.01)

(52) U.S. Cl.
CPC .................. *G06Q 10/0637* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

Arup Nanda and Steven Feuerstein, Oracle PL/SQL for DBAs, O'Reilly Media, Inc., Oct. 2005 First Edition, pp. 51-52.*

*Primary Examiner* — Eric W Stamber
*Assistant Examiner* — Alan Torrico-Lopez
(74) *Attorney, Agent, or Firm* — Elliot, Ostrander & Preston, P.C.

(57) ABSTRACT

In accordance with disclosed embodiments, there are provided methods, systems, and apparatuses for implementing cross-organizational processing of business intelligence metrics including, for example, means for scheduling a time for metrics collection from databases of a host organization; generating one or more messages and associated parameters to implement the metrics collection at the host organization; enqueuing the one or more messages and associated parameters for processing by the host organization; dequeuing the one or more messages and associated parameters into the host organization for processing, wherein the processing is to output the metrics collection into an intermediate table; capturing the metrics collection output via the processing at the intermediate table; and exposing the intermediate table to metrics queries. Other related embodiments are disclosed.

25 Claims, 7 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 8,108,428 B1* | 1/2012 | Wencel .................. G06Q 10/10 705/300 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0027962 A1* | 1/2008 | Rong .................... G06Q 30/02 |
| 2008/0276234 A1* | 11/2008 | Taylor ...................... G06F 8/60 717/177 |
| 2010/0050233 A1* | 2/2010 | Ross ........................ G06F 21/33 726/2 |
| 2011/0022586 A1* | 1/2011 | Wilkinson ........ G06F 17/30306 707/720 |
| 2011/0246925 A1* | 10/2011 | Marchand .............. G06Q 10/06 715/772 |
| 2011/0270795 A1* | 11/2011 | Smith .................... G06F 9/5011 706/52 |
| 2012/0310996 A1* | 12/2012 | Kulack ............. G06F 17/30292 707/810 |
| 2013/0304547 A1* | 11/2013 | Adler ............... G06Q 10/06393 705/7.39 |
| 2014/0040306 A1* | 2/2014 | Gluzman Peregrine ..................... G06Q 10/0639 707/769 |

* cited by examiner

SYSTEMS, METHODS, AND APPARATUSES FOR IMPLEMENTING CROSS-ORGANIZATIONAL PROCESSING OF BUSINESS INTELLIGENCE METRICS

CLAIM OF PRIORITY

This application is related to, and claims priority to, the provisional utility application entitled "BUSINESS INTELLIGENCE PRODUCT METRICS," filed on Sep. 12, 2012, having an application No. 61/700,040, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems, methods, and apparatuses for implementing cross-organizational processing of business intelligence metrics.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

A single a multi-tenant database system operates to store data on behalf of a multitude of paying subscribers, each being a "tenant" of the database system, hence the term multi-tenant database system.

Within such an operational environment, computational efficiency, system responsiveness, and data security are all of paramount concern both to the provider of the multi-tenant database system and to the subscribers or tenants of such a system.

Over the past many years as the technology has matured and become increasingly commonplace within the marketplace, the conventional techniques used to perform various cross-organizational processing tasks have been overwhelmed by evolving security concerns and by the increasing computational burden of an ever increasing quantity of data to be stored within such a multi-tenant database system on behalf of its subscribers.

For instance, conventionally available cross-organizational processing techniques may not sufficiently accommodate stringent HIPAA (Health Insurance Portability and Accountability Act) protections enacted to secure private health care data for individuals due to a lack of abstraction of metrics and other metadata for such data. Similar concerns exist with other sensitive data, regardless of whether such data is specifically protected by Federal law. Further still, conventionally available cross-organizational processing techniques have failed to scale to multi-tenant database systems over a certain size and eventually reach an unacceptable state of perpetual processing burden in which pending and newly incoming processing demands outstrip processing capacity, resulting in workload that never completes, may be terminated or time-out, which may result in erroneously processed data records, non-processed data records, locked data records, and other problems familiar to those in the database arts.

The present state of the art may therefore benefit from the systems, methods, and apparatuses for implementing cross-organizational processing of business intelligence metrics as described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1:
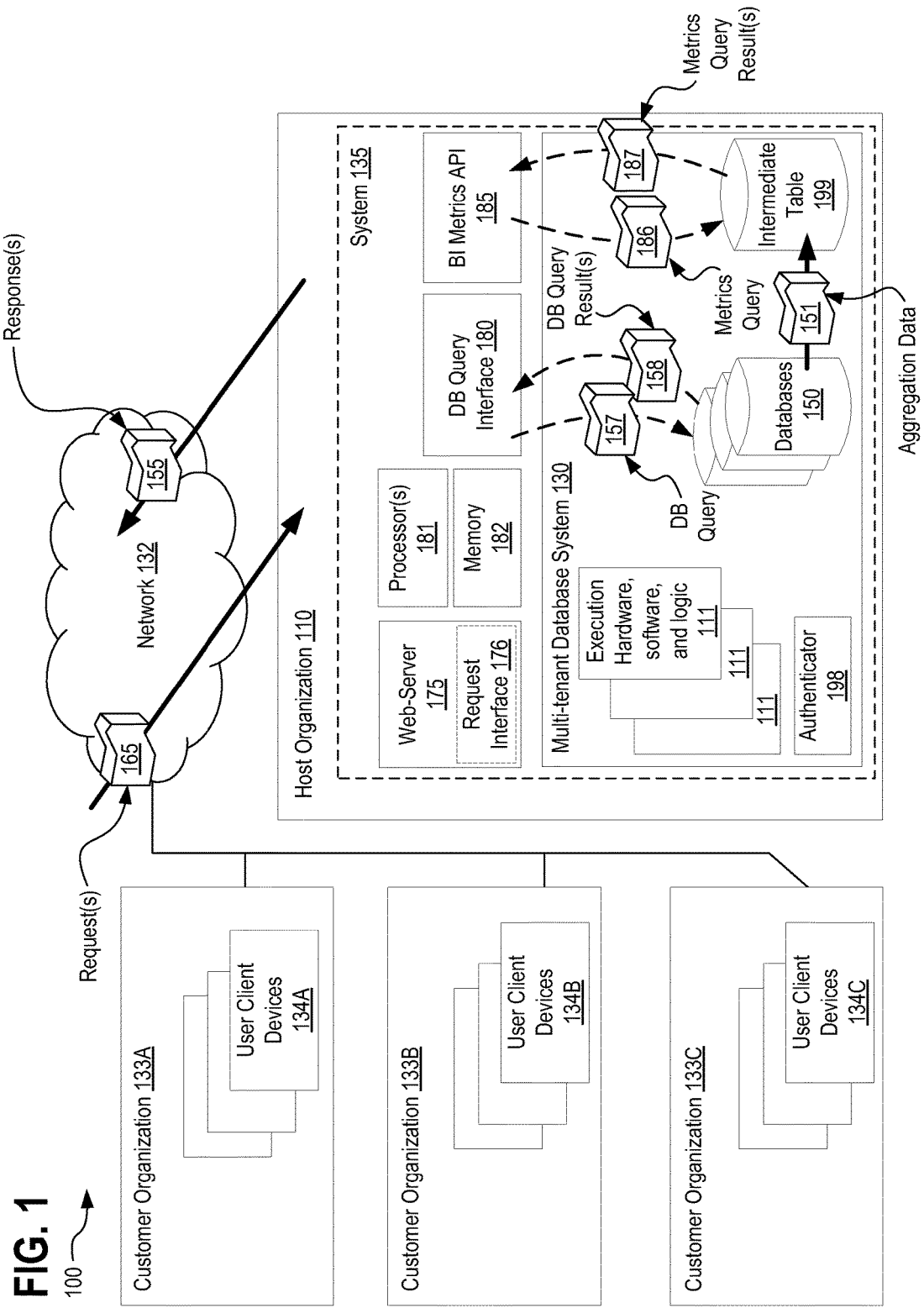
FIG. 1 depicts an exemplary architecture in accordance with described embodiments.

Described herein are systems, methods, and apparatuses for implementing cross-organizational processing of business intelligence metrics in an on-demand service environment. Such systems, devices, and methods may include, for example, means for: scheduling a time for metrics collection from databases of a host organization; generating one or more messages and associated parameters to implement the metrics collection at the host organization; enqueuing the one or more messages and associated parameters for processing by the host organization; dequeuing the one or more messages and associated parameters into the host organization for processing, wherein the processing is to output the metrics collection into an intermediate table; capturing the metrics collection output via the processing at the intermediate table; and exposing the intermediate table to metrics queries.

As multi-tenant database systems grow in size and complexity it becomes increasingly difficult to accommodate certain tasks, such as cross-organizational processing needs for records stored within the database. This may include gathering business intelligence metrics for such data on a cross-organizational basis, in which aggregated data is sought that is somewhat abstracted from the underlying records themselves.

Such cross-organizational processing using conventional techniques can take an unacceptable amount of time to process and may fail to return or exit correctly due to the inefficient processing delay.

Moreover, the architecture by which such cross-organizational processing has been conducted in the past may present a security risk by allowing research and development personnel to access protected data records directly as part as their role in creating and implementing cross-organizational processing of business intelligence metrics, however, it would be preferable if even the research and development personnel were prohibited from accessing the underlying data records on a cross-organizational basis and instead performed their processing and work on an aggregated set of data that has been abstracted somewhat from the protected information itself. For instance, it may be preferable for research and development personnel to submit metrics queries against an abstracted dataset rather than generating their requirement metrics, statistics, and metadata by directly querying the databases of the host organization.

Conventionally speaking, individuals requiring business intelligence metrics spanning multiple organizations within a multi-tenant database system were simply not allowed to have access to the database in such a way, due to the data security concerns. Accordingly, the workload was transitioned into a more specialized research and development team tasked with developing and running the queries to generate the business intelligence metrics required. Such individuals possessed special knowledge about how data is stored within the multi-tenant database-system and how to write metrics queries efficiently and correctly to yield the required cross organization metrics while still complying with data security mandates. Such a model nevertheless results in a fundamental problem.

Specifically, from a performance perspective, having a different team with specialized knowledge perform the work is an inefficient use of the experts' resources and represents a disconnect from the persons requiring the metrics versus the persons responsible for generating them.

The methodologies described herein permit the individuals requiring such business intelligence metrics to develop and run metrics queries to yield the desired metrics query results without having to rely upon a separate research and development team. More particularly, the methodologies permit users to run such metrics queries through an API against an intermediate table which stores various metrics and metadata for multiple organizations in an aggregated form that is abstracted from the underlying records being protected. Thus, even if an attempt was made to violate security protocol, there simply is no protected data to be accessed at the intermediate table, and as such, any such malicious intent or act would be to no ill effect.

Automated cross-organizational processing means have been re-architected such that the multi-tenant database can gather the cross-organization metrics and metadata into the intermediate table in a standardized way without requiring any individual to develop and run specialized cross-organizational database queries. The cross-organization metrics and metadata are then exposed from the intermediate table and due to the aggregation and abstraction, no longer pose a security risk.

According to certain embodiments, cross-organizational processing means extract all the necessary information from each of the relevant databases within a multi-tenant database system in bulk, at once, via back-end processing that is non-interactive with human users.

In certain embodiments, resource management is implemented to optimize available resources of the multi-tenant database system by performing such backend processing at off-peak times. For instance, a cron job scheduler, may be utilized with a traffic light system or other load monitoring and management system which dispatches processing demands imposed by the gathering of such cross-organization metrics and metadata during periods of low or reduced activity so as to avoid creating latency in the system for other real-time processing demands and transactions being handled by the multi-tenant database system. Jobs may be triggered to run on a daily, weekly, monthly, quarterly basis, etc., and then a workload management system can enqueue and de-queue (e.g., release or dispatch) the back-end processing work in an optimized manner.

According to certain embodiments, an Application Programming Interface (API) is exposed to customers, organizations, subscribers, and the metrics team capable of accepting business intelligence metrics queries for processing against the intermediate table having the cross-organization metrics and metadata stored therein, without ever requiring any cross-organization database query to be executed against the underlying records of the multi-tenant database system. In particular, while the data in the intermediate table exposed via the API includes cross-organization metrics and metadata, it is accessible without a cross-organization query via the API because it has already been aggregated and abstracted prior to its placement into the intermediate table, thus allowing a greater population of users to access the data themselves, while ensuring proper security of underlying data records in the multi-tenant database system which store the protected data separate from the intermediate table having only the abstraction data.

For a more concrete example, consider a business intelligence report being run against the intermediate table by a user with no particularly specialized access rights. It is desirable for the user to be able to develop and execute their own queries, however, under no circumstances whatsoever, should that user be capable of revealing named accounts, named contacts, leads, custom object rows, private health records, sensitive financial records, etc., stored by the multi-tenant database system in a production environment. Because the intermediate table does not itself include such data, it simply is not possible to reveal the protected information through the exposed API, regardless of any exploit discovered or utilized by a person with malicious intent.

Such an architecture locks down access to the protected data in a way that previously available solutions did not. Because the data is collected on the backend in a standardized way, changes to the data structures, objects, and records do not break the collection means as was a problem in the past. Because no individual can see the individual protected records from the aggregated data stored within the intermediate table, it is not necessary to secure special permission from every single account owner when running metrics queries against the aggregation data within the intermediate table, as their data is never exposed.

Further still, the improved methodologies enable testable results. For instance, a developer can introduce a test that addresses a single row by executing against a particular instance or a particular tenant or organization, and then verify that metrics corresponding to the exactly one row are reflected by the intermediate table. This process allows changes to the backend processing and collection means to be validated before rolling them out to the production environment.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 depicts an exemplary architectural 100 in accordance with described embodiments. Depicted here are multiple customer organizations 133A, 133B, and 133C, each having therein multiple user client devices 134A, 134B, and 134C respectively. The customer organizations 133A-C and the multiple user client devices 134A-C within them communicate with a host organization 110 via the network 132. For instance, by communicating via the Internet, customer organizations 133A-C may utilize on-demand cloud based services provided by the host organization 110 without having to locally install software or host database hardware and functionality locally within the customer organizations 133A-C.

Customer organizations 133A-C submit requests 165 to the host organization 110 and receive responses 155 from the host organization 110. Such requests may be database queries, metrics queries, or other work. Within the host organization 110 is a system 135 which implements a variety of architectural functionality on behalf of the host organization 110 including processors 181 and memory 182 to execute logic and other instructions to carry out the objectives of the host organization 110.

Request interface 176 of the host organization 110 is operable to receive the requests 165 and return responses 155 to the various customer organizations 133A-C and their user client devices 134A-C. Such a request interface 176 may be implemented via web-server 175. Multi-tenant database system 130 within host organization 110 includes execution hardware, software, and logic 111 that is shared across multiple tenants of the multi-tenant database system 130. Databases 150 operate to store data within underlying database records on behalf of tenants of the host organization 110, and authenticator 198 performs authentication services and credentialing of users of the multi-tenant database system 130 on behalf of the host organization.

As can be further seen within host organization 110, a DB query interface 180 interacts with the databases 150 by passing a database query 157 to the databases 150 and receiving database query results 158 from the databases 150. Such database interactions cannot, however, perform cross-organizational data gathering of metrics and statistics as is sometimes required on behalf of various developers, clients, customer organizations, users, administrators, etc., due to a prohibition against cross-organizational database queries. Each customer organization's 133A-C data stored within the multi-tenant database system 130 is protected from access by others absent express sharing permissions by the customer organization having ownership of such data. Accordingly, cross-organizational data queries cannot be conducted as no entity has sufficient permission to perform them, and as discussed above, it is considered a potential breach of security to allow for special permissions by any individual, even developers, to perform queries that span across multiple customer organizations' 133A-C data.

Accordingly, there is further described herein a Business Intelligence (BI) Metrics API at element 185 which is capable of receiving a metrics query 186 and returning metrics query results 187, as depicted. Such metrics queries 186 and metrics query results 187 are not executed against the databases 150 of the multi-tenant database system 130 having the various customer organizations' 133A-C underlying data records stored therein, as this would again represent a potential security violation. Rather, the BI metrics API 185 interfaces to an intermediate table 199 capable of servicing the metrics queries 186 and thus returning metrics query results 187. The intermediate table 199 does not itself possess the various customer organizations' 133A-C underlying data records as such records are stored within the databases 150 of the multi-tenant database system 130. Instead, the intermediate table 199 is limited to storing only aggregation data 151 that is abstracted from the various customer organizations' 133A-C underlying data records, and as such, no query against the intermediate table 199 is capable of returning protected data because such data does not exist within the query source, that is to say, the protected data does not reside within the intermediate table 199 and thus, the intermediate table 199 cannot return what it does not itself have.

In such a way, statistics and metrics can be made accessible to various clients, users, customer organizations, developers, administrators, and so forth, via the BI metrics API 185 which interfaces only to the intermediate table 199, without risking a security violation by exposing sensitive and protected data of the various customer organizations' 133A-C underlying data records as stored within the databases 150.

For example, according to one embodiment, the host organization 110 receives and processes a cross-organizational metrics query by submitting a metrics query 186 to the intermediate table via the BI metrics API and by further receiving a metrics query result 187 from the BI metrics API. In such an embodiment, the cross-organizational metrics query presented may require information from more than one of the customer organizations 133A-C, however, the query does not pose a risk to the protected data of the customer organizations 133A-C because the query is serviced by the aggregation data 151 stored in the intermediate table 199 and cannot gain access to protected database records belonging to the various customer organizations 133A-C which are stored separately within the databases 150.

Figure 2:
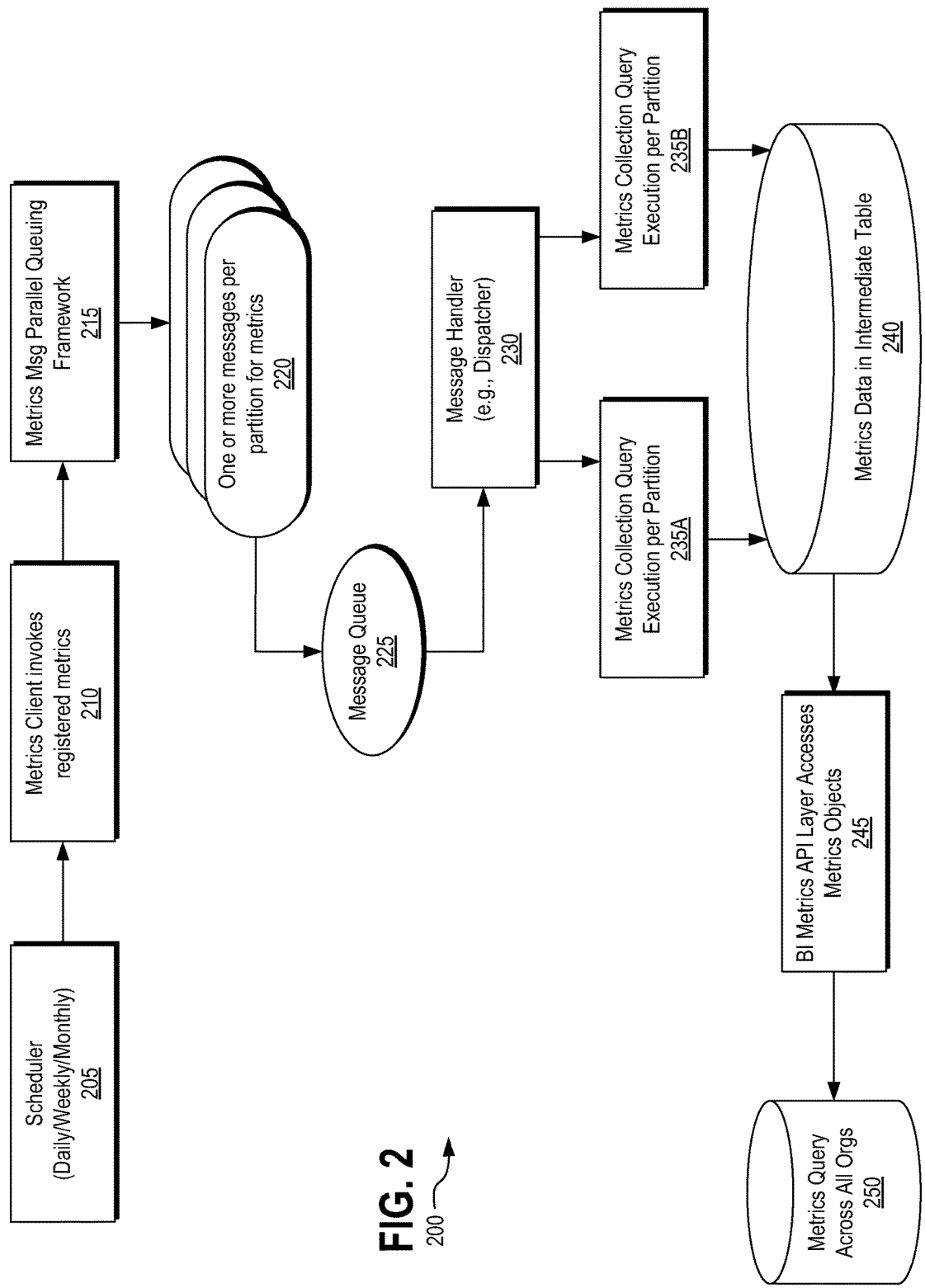
FIG. 2 depicts an exemplary architectural process flow in accordance with described embodiments.

FIG. 2 depicts an exemplary architectural process flow 200 in accordance with described embodiments. Scheduler 205 allows for scheduled metrics to be gathered on a variety of different schedules (e.g., daily, weekly, monthly, quarterly, etc.) depending on the particular requirements of the features for which the metrics are being gathered. Scheduler 205 permits clients, users, organizations, developers, and others seeking such metrics to create a new job for scheduling by invoking the classes available via scheduler 205.

At block 210 the metrics client invokes registered metrics, specifically, those created and implemented through the classes of scheduler 205.

At block 215, a metrics messaging parallel queuing framework takes up created jobs from the prior operations and makes an inference based on the object shape. For instance, certain metrics and statistics are gathered on a per-organizational level, others are gathered on a per-user level, and yet other metrics and statistics are cross-organizational, and as such, are gathered on a cross-organizational level, such as per-node, per-partition, or per-database. The metrics messaging parallel queuing framework at block 215 determines the scope and granularity required to implement the created job.

At element 220, one or more messages are created per partition to gather the required metrics. The appropriate parameters and messages are generated based on the scope and granularity determined by the metrics messaging parallel queuing framework at block 215 in the preceding operation.

At element 225, a message queue enqueues the messages and their associated parameters for dispatch. Although the workload may be queued and ready for dispatch, such work is not necessarily released for processing depending upon the present workload and other load balancing considerations of the host organization.

At element 230, a message handler (e.g., a dispatcher) de-queues the enqueued messages in the message queue 225 by dispatching workload for processing by the host organization. Messages may be de-queued by the message handler 230 based on the host organization's system load. For instance, when the host organization's workload is determined to be non-hot or determined to have excess processing capacity, the messages may be de-queued for processing. Conversely, when the host organization's 110 present workload is hot or at capacity, such enqueued messages may be delayed so as not to further burden current processing demands of the host organization 110. In such a way, workload associated with such statistics and metrics gathering may be achieved without degrading performance of higher priority real-time processing requirements.

De-queuing the messages causes the messages stored in the message queue 225 and their associated parameters determined previously to be released for processing by the host organization 110. Here messages are shown being processed in parallel at metrics collection query execution per partition blocks 235A and 235B. For instance, a query builder may construct a query against the databases of the host organization (e.g., see databases 150 at FIG. 1) using the messages and associated parameters to cause the built queries to return the metrics for collection in the intermediate table described previously. Moreover, parallel processing may occur on a non-partition basis, such as per-node, per-database, per-organization, per-user, etc.

Element 240 depicts the metrics data being deposited into a intermediate table (e.g., such as the intermediate table 199 shown at FIG. 1) responsive to the metrics collection query execution per partition operations at 235A and 235B. The intermediate table at element 240 provides a common repository for all metrics and statistics gathered across all the organizations on behalf of the host organization, and as such, provides a single/common source for metrics queries separate and distinct from the databases storing the underlying data records of the various customer organizations. Execution of the metrics collection queries at blocks 235A-B permits the intermediate table at element 240 to store aggregation data in its abstracted form without exposing the underlying database records of the customer organizations.

In certain embodiments, a bulk collect query is built to trigger the collection and deposit of a large number of rows. For instance, using an Oracle8i™ BULK COLLECT call it may be possible to negate certain overhead otherwise associated with the collection of a large number of rows. This is because an overhead cost is associated with each context switch between PL and SQL engines, however, by performing the same DML operation for each item in a large collection it is possible to reduce context switches by bulk binding the whole collection to the DML statement in one operation. A BULK COLLECT INTO construct may further be utilized to bind the output of the query into the collection at the intermediate table as depicted by element 240.

According to a particular embodiment, BULK COLLECT calls are implemented on a per-partition basis, on a per-node basis, or on a per-database basis, in which the BULK COLLECT call causes all metrics or statistics gathering to be fulfilled for the given partition, node, or database as a single call. For instance, larger customer organizations may consume an entire partition, and as such, implementing the BULK COLLECT call on a per-partition basis will fulfill all metrics or statistics gathering per the scheduled collection as a single call for the given customer organization, however, additional per-partition BULK COLLECT calls may execute in parallel if metrics collection is being performed for more than a single customer organization. Other very large customer organizations may constitute multiple such partitions, and thus, multiple BULK COLLECT calls would be required. Regardless, use of the BULK COLLECT calls enables an overhead savings by processing a very large number of rows as a single operation rather than iteratively processing the applicable rows in smaller groups.

While such BULK COLLECT calls may be resource intensive and time-consuming to process, they may nevertheless be more efficient than fragmented processing where the same query is executed against a very large number of rows, as is common with statistics and metrics gathering. Moreover, by appropriately dispatching the workload when excess processing capacity exists within the host organization, negative effects associated with such a large computational demand can be mitigated or wholly avoided from the perspective of users attempting to execute real-time and thus time-sensitive queries. Executing such metrics collection calls may be referred to as a non-real-time processing or asynchronous processing in contrast to real-time processing and transactions which immediately return a result and are thus much more sensitive to delay and perceived latency in processing.

At this stage, individual metrics queries are not being serviced, but rather, auto-built queries are being executed to service the scheduled metrics collection and gathering objectives for the required features and the results of those built queries are deposited into the intermediate table as aggregation data in an abstracted from. It is then this aggregation data within the intermediate table as shown at element 240 which is interfaced to the BI metrics API capable to service metrics queries.

Thus, as shown at element 245, the BI metrics API layer accesses metrics objects which are stored within the intermediate table at element 240, for instance, in order to return metrics query results responsive to a metrics query.

Lastly, at element 250, it is possible for a metrics query across all organizations to be executed which is serviced by the BI Metrics API layer having access only to the aggregation data stored by the intermediate table at element 240.

According to certain embodiments, the BI metrics API queries into the intermediate table's objects using the logical presentation of metrics objects. While all of the collected data is stored within the same intermediate table, each object may nevertheless have a different context or meaning, and thus, the various objects are exposed using logical presentation so that each object operates in the logical context for what a particular column means to the given metric being queried via the BI metrics API.

With the collected data deposited into the intermediate table it is now possible for users, clients, developers, etc., to submit metrics queries that require a cross-organizational view of aggregation data without requiring the host organization to perform prohibited cross-organizational queries.

According to a particular embodiment, a cross-organizational view is exposed via the BI metrics API by using a metadata layer which describes the metrics present in the aggregation data stored within the intermediate table and then the aggregation data is logically exposed on a per-tenant basis. Tenants of the multi-tenant database are prohibited from submitting database queries which exceed the scope of their corresponding organization or tenancy, however, aggregation data stored within the intermediate table overcome this prohibition, where appropriate, by allowing metrics queries to the intermediate table that may return metrics query results attributable to multiple such customer organizations, thus permitting cross-organizational metrics or statistics to be revealed without performing cross-organizational database queries.

In one embodiment, a customer organization ID column is included with the aggregation data within the intermediate table. For instance, using the customer organization ID column to store aggregated metrics rows within the intermediate table, the Business Intelligence system is able to interpret how application is utilized across the various tenants of the multi-tenant database system.

In certain embodiments, a multi-organizational metrics query view is permitted beyond a single organization as identified by the customer organization ID column. Such an approach permits cross-organizational queries which is necessary to solve certain problems on behalf of tenants requiring cross-organizational metrics despite the prohibition against cross-organizational database queries. For instance, it may be that a particular organization permits multiple distinct but related organizations to yield common metrics or statistics, and by identifying the relevant records within the aggregation data via the customer organization ID column, cross-organizational query prohibition may appear to be bypassed, when in actuality, it is observed while also permitting metrics query results to be returned with data having a scope greater than a single customer organization.

In other situations, administrators of the host organization itself require statistics and metrics that far exceed the scope of a single customer organization. Such metrics may be required in order to efficiently operate the multi-tenant database system, identify usage patterns, resource limitations, and so forth. Regardless, it is highly inefficient to execute a particular query for every single one of the hundreds of thousands of individual tenants of the multi-tenant database system, many of which are relatively small. However, by constructing such a metrics or statistics gathering call as a BULK COLLECT on a per-database basis, the collection may execute across all organizations present within the multi-tenant database system much more efficiently as the number of individual database instances supporting the multi-tenant database system is on the order of 10s rather than on the order 100,000s as is the case with individual tenants occupying the multi-tenant database.

Because the intermediate table is exposed via the BI Metrics API, it is further possible for users to incorporate metrics queries into their application code executing at the host organization, for instance, to take some action based on gathered metrics or statistics, or to provide further refinement to them, or to incorporate them into reports, and so forth.

In other embodiments, the gathered statistics and metrics represented by the aggregation data is tagged according to when the statistics and metrics were actually collected. In a related embodiment, historical and trending statistics and metrics are enabled by collecting the data according to a scheduled periodicity (e.g., daily, weekly, monthly, quarterly, etc.) in addition to time and date tagging the data collected such that change over time within the gathered statistics and metrics can be queried for via metrics queries.

Where multiple SQL code queries are executed to gather a single collection of metrics and statistics, the results may be combined before insertion into the intermediate table to improve collection efficiency. For instance, such results may be merged based on OrgID, UserID, metrics time/date, key prefix, metrics object, metric type, column queried, and so forth.

According to certain embodiments, cross-organization view metrics queries are restricted to administrative users of the host organization despite the existing safeguards described above that result from performing metrics queries against the intermediate table rather than the databases of the host organization. For instance, it may be appropriate to restrict metrics queries have a scope that exceeds a single organization to greater scrutiny as it is unlikely that the overwhelming majority of the user population will require such statistics. For those that do, special one-off APIs can be created that permit a certain metrics query, without having to open up the full metrics query scope capability to a non-administrative user.

Where such a special one-off API is required, administrators may hard-code the permissible parameters, Organization IDs, or other scope restrictions into the API while still permitting the target user to customize aspects such as periodicity, record counts, time and date stamp ranges, and so forth. Such an API can then be exposed on a per-org, per-tenant, or per-user basis to suit the needs of the requestor.

Similarly, the host organization providing the BI Metrics Query API may restrict all metrics queries to a single-scope customer organization query by default, and such scope may be locked according to context of the user submitting the query. Such a model may provide further security precautions for the BI Metrics Interface exposed to the general user population while still permitting administrative users to conduct cross-organizational metrics queries against the intermediate table, still while observing the prohibition against cross-organization database queries which is attained via the described methodologies.

Figure 3:
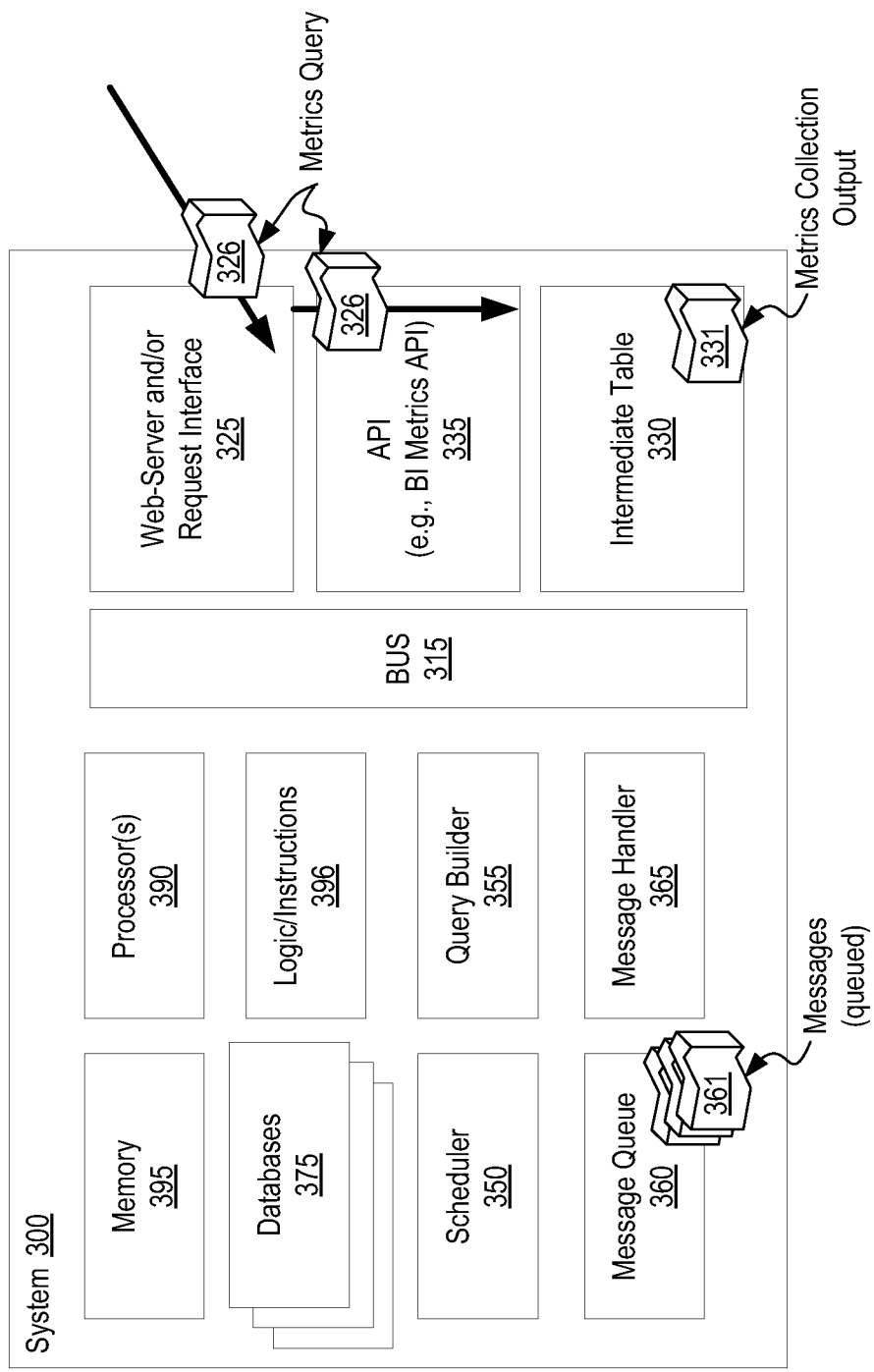
FIG. 3 shows a diagrammatic representation of a system in accordance with which embodiments may operate, be installed, integrated, or configured.

FIG. 3 shows a diagrammatic representation of a system 300 in which embodiments may operate, be installed, integrated, or configured.

In accordance with one embodiment, there is a system 300 having at least a processor 390 and a memory 395 there to execute logic and/or instructions 396. According to such an embodiment, the system 300 further includes databases 375 having data records stored therein; a scheduler 350 to schedule a time for metrics collection from the databases 375; a query builder 355 to generate queries based on messages and associated parameters required to implement the metrics collection; a message queue 360 to enqueue the one or more messages 361 and associated parameters for processing via the system 300; a message handler 365 to dispatch the one or more messages and associated parameters into the system for processing, wherein the processing is to output the metrics collection 331; an intermediate table 330 to capture the metrics collection output 331 pursuant to the processing; and an Application Programming Interface 335 to expose the intermediate table 330 to metrics queries. Such components are communicatively interfaced within the system 300 via bus 315.

According to another embodiment, system 300 further includes a web-server 325 to receive metrics queries 326 from a plurality of customer organizations, in which the metrics queries 326 are to be passed to the API 335 for execution against the intermediate table 330. In such an embodiment, the plurality of customer organizations communicably interface with the system 300 via a network; and in which each customer organization is an entity selected from the group consisting of: a separate and distinct remote organization, an organizational group within the host organization, a business partner of the host organization, or a customer organization that subscribes to cloud computing services provided by the host organization.

Figure 4:
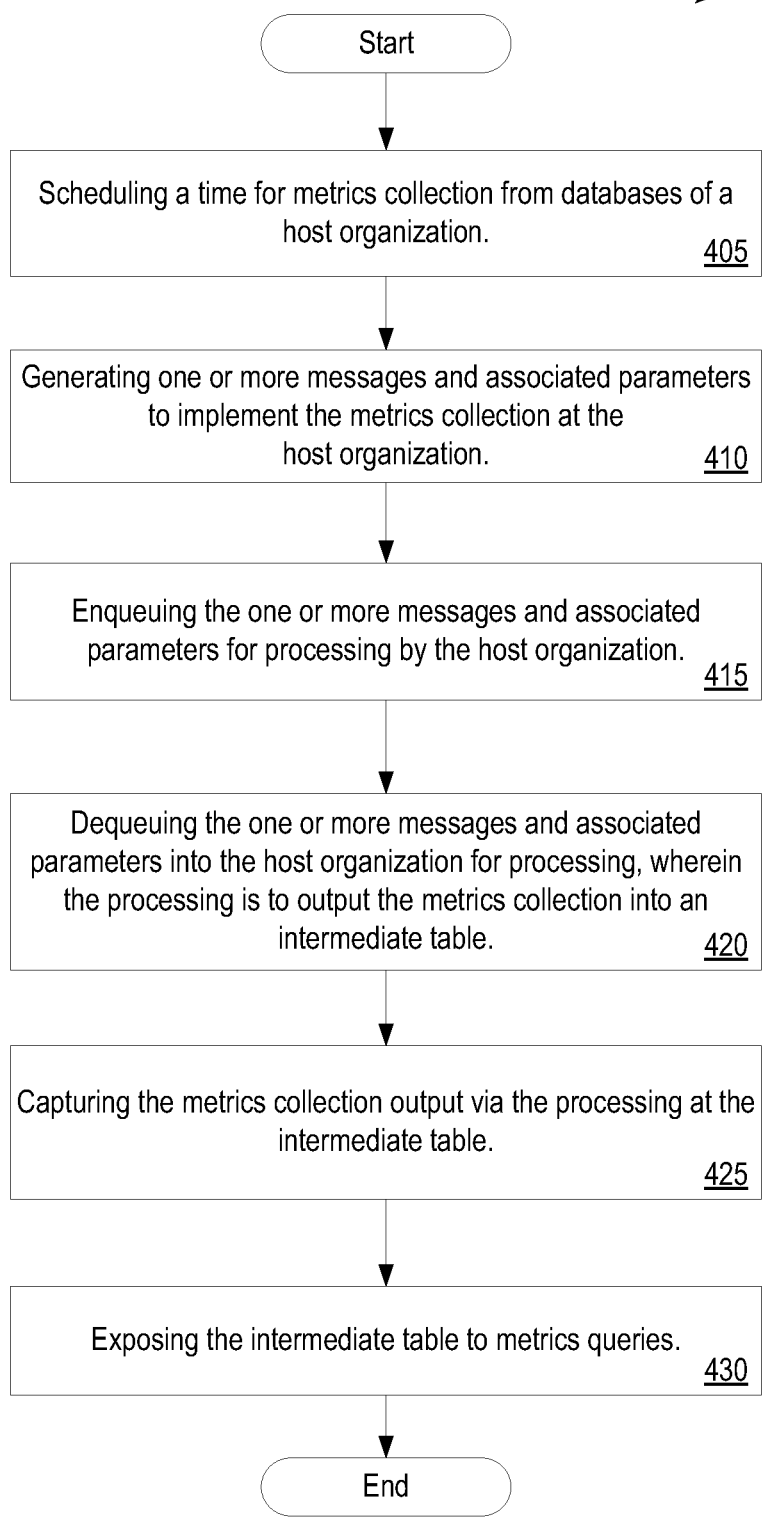
FIG. 4 is a flow diagram illustrating a method in accordance with disclosed embodiments.

FIG. 4 is a flow diagram illustrating a method 400 in accordance with disclosed embodiments. Method 400 may be performed by processing logic that may include hardware (e.g., circuitry, dedicated logic, programmable logic, microcode, etc.), software (e.g., instructions run on a processing device to perform various operations such scheduling, generating, enqueuing, dequeuing, capturing, exposing, transmitting, sending, receiving, monitoring, etc., in pursuance of the systems, apparatuses, and methods for implementing cross-organizational processing of business intelligence metrics, as described herein. For example, a system 135 as depicted at FIG. 1, system 300 at FIG. 3, or machine 500 at FIG. 5 may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 405, processing logic schedules a time for metrics collection from databases of a host organization.

At block 410, processing logic generates one or more messages and associated parameters to implement the metrics collection at the host organization.

At block 415, processing logic enqueues the one or more messages and associated parameters for processing by the host organization.

At block 420, processing logic dequeues the one or more messages and associated parameters into the host organization for processing, wherein the processing is to output the metrics collection into an intermediate table.

At block 425, processing logic captures the metrics collection output via the processing at the intermediate table.

At block 430, processing logic exposes the intermediate table to metrics queries.

According to another embodiment of method 400, scheduling the time for metrics collection includes scheduling a metrics collection job at a specified periodicity; and in which the metrics collection job iterates at the specified periodicity.

According to another embodiment of method 400, the specified periodicity is selected from one of a daily periodicity, a weekly periodicity, a bi-weekly periodicity, a monthly periodicity, a quarterly periodicity, and a yearly periodicity.

According to another embodiment, method 400 further includes: triggering the metrics collection at the time scheduled, in which triggering the metrics collection includes at least (i) generating one or more messages and associated parameters to implement the metrics collection and (ii) enqueuing the one or more messages and associated parameters for processing.

According to another embodiment, method 400 further includes: determining a granularity required to implement the metrics collection, the granularity being selected from one of a per-user, a per-tenant, a per-organization, a per-node, per-partition, or a per-database granularity; and in which generating one or more messages and associated parameters includes generating the one or more messages for the metrics collection at the determined granularity.

According to another embodiment of method 400, dequeuing the one or more messages and associated parameters into the host organization includes: dequeuing the one or more enqueued messages from a message queue; and releasing the one or more messages and associated parameters for immediate processing.

According to another embodiment of method 400, dequeuing the one or more messages and associated parameters into the host organization for processing includes: releasing a plurality of messages for processing in parallel by releasing at least one message to each of a plurality of nodes, partitions, or databases; in which the at least one message is to process on a per-node, per-partition, or per-database basis concurrently within the host organization; and capturing the metrics collection output via the concurrent processing at the intermediate table.

According to another embodiment of method 400, the concurrent processing of the at least one message on a per-node, per-partition, or per-database basis generates related metrics collection output from each of the nodes, partitions, or databases respectively; and in which the method further includes joining the related metrics collection output during insertion into the intermediate table.

According to another embodiment of method 400, the one or more messages and associated parameters are implemented via a bulk processing database call.

According to another embodiment of method 400, capturing the metrics collection output via the processing at the intermediate table includes specifying a BULK COLLECT INTO call for the processing and specifying the intermediate table as a target repository for the metrics collection output.

According to another embodiment, method 400 further includes: monitoring workload of the host organization; and in which dequeuing the one or more messages and associated parameters into the host organization for processing includes releasing the one or more messages for immediate processing when the workload of the host organization is below a threshold.

According to another embodiment, method 400 further includes: processing real-time transaction requests at the host organization concurrently with the one or more messages and associated parameters to implement the metrics collection; and prioritizing the real-time transaction requests over the one or more messages and associated parameters to implement the metrics collection.

According to another embodiment of method 400, capturing the metrics collection output via the processing at the intermediate table includes capturing aggregation data at the intermediate table; in which the aggregation data of the intermediate table is abstracted from underlying records of the database upon which the aggregation data is based.

According to another embodiment of method 400, the databases of the host organization store underlying records on behalf of customer organizations, the underlying records having sensitive data stored therein; and in which the intermediate table stores the metrics collection output as aggregation data separate and distinct from the databases of the host organization, in which the intermediate table is void of the underlying records having sensitive data stored therein.

According to another embodiment of method 400, the underlying records of the databases having sensitive data stored therein include at least one of HIPAA (Health Insurance Portability and Accountability Act) protected data; Sarbanes Oxley Act (SOX) protected data; proprietary sales data; proprietary financial data; proprietary trade-secret data; and government classified data; and in which the aggregation data is void of the sensitive data and includes metadata, metrics, and statistics.

According to another embodiment of method 400, the intermediate table includes a queryable data repository common to a plurality of tenants of a multi-tenant database operated by the host organization; in which the databases of the host organization service database queries and do not service metrics queries; and in which the intermediate table services the metrics queries and does not service database queries.

According to another embodiment of method 400, exposing the intermediate table to metrics queries includes: exposing a Business Intelligence (BI) Metrics Application Programming Interface (API) to users of the host organization; in which the BI Metrics API receives metrics queries for execution against the intermediate table; and in which the BI Metrics API returns metrics query responses responsive to the metrics queries.

According to another embodiment of method 400, the metrics collection output captured via the intermediate table is tagged with time and/or date information specifying when the metrics collection output was captured.

According to another embodiment of method 400, the metrics collection output captured via the intermediate table is associated with a customer organization ID column identifying which one among a plurality of customer organizations of the host organization is associated with any metric, statistic, or metadata present within the metrics collection output captured by the intermediate table.

According to another embodiment, method 400 further includes: receiving a metrics query; and returning metrics query results from the intermediate table having metrics, statistics, and/or metadata associated with multiple customer organizations according to the customer organization ID column.

According to another embodiment of method 400, the databases of the host organization prohibit cross-organizational database queries having a query scope that exceeds a single individual customer organization; and in which the intermediate table is queryable via metrics queries having a query scope that exceeds a single individual customer organization.

According to another embodiment of method 400, a user of the host organization is restricted to metrics queries having a query scope that is limited to a single individual customer organization to which the user belongs; and in which system administrators of the host organization are enabled to perform metrics queries having a query scope that exceeds a single individual customer organization via a restricted administrative interface for the system administrators.

According to another embodiment of method 400, exposing the intermediate table to metrics queries includes: exposing each of a plurality of objects within the intermediate table having aggregation data stored therein using a logical presentation, in which each of the plurality of objects operates within a logical context of a particular column's meaning to a given metric being queried.

According to another embodiment of method 400, the host organization implements the method via computing architecture of the host organization including at least a processor and a memory; in which a user interface operates at a user client device remote from the host organization and communicatively interfaces with the host organization via a public Internet; and in which the host organization operates as a cloud based service provider to the user client device.

According to another embodiment of method 400, the host organization provides a multi-tenant database system via the databases and the computing architecture of the host organization, the multi-tenant database system having elements of hardware and software that are shared by a plurality of separate and distinct customer organizations, each of the separate and distinct customer organizations being remotely located from the host organization.

According to a particular embodiment, there is non-transitory computer readable storage media having instructions stored thereon that, when executed by a processor in a host organization, the instructions cause the host organization to perform operations including: scheduling a time for metrics collection from databases of the host organization; generating one or more messages and associated parameters to implement the metrics collection at the host organization; enqueuing the one or more messages and associated parameters for processing by the host organization; dequeuing the one or more messages and associated parameters into the host organization for processing, wherein the processing is to output the metrics collection into an intermediate table; capturing the metrics collection output via the processing at the intermediate table; and exposing the intermediate table to metrics queries.

Figure 5:
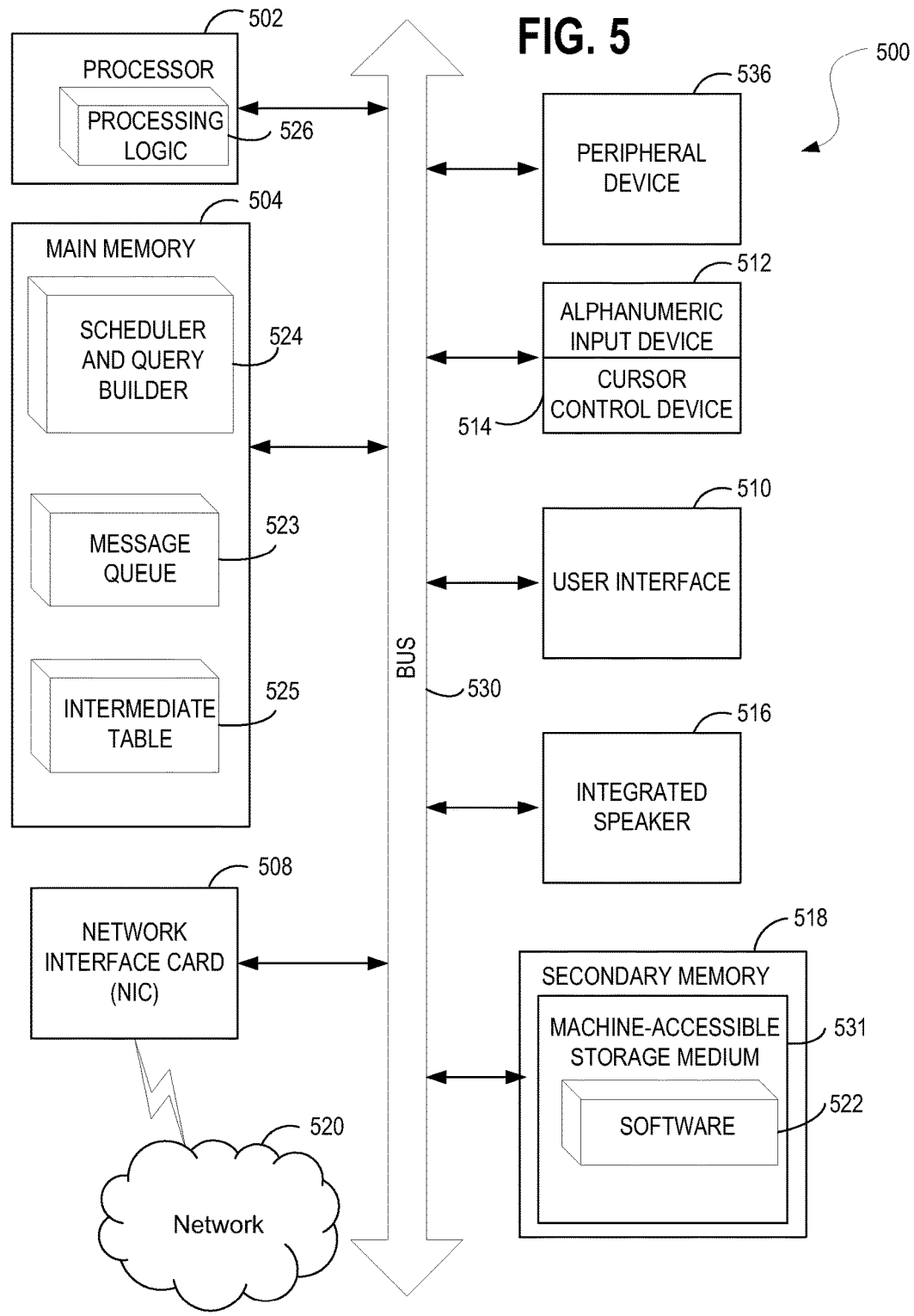
FIG. 5 illustrates a diagrammatic representation of a machine in the exemplary form of a computer system, in accordance with one embodiment.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes a scheduler and query builder 524 to schedule metrics collection jobs and build the appropriate messages and parameters necessary to process them. Main memory 504 further includes a message queue 523 to enqueue messages awaiting processing, and an intermediate table 525 to store aggregation output by the metrics collection processing. Main memory 504 and its sub-elements are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

Figure 6:
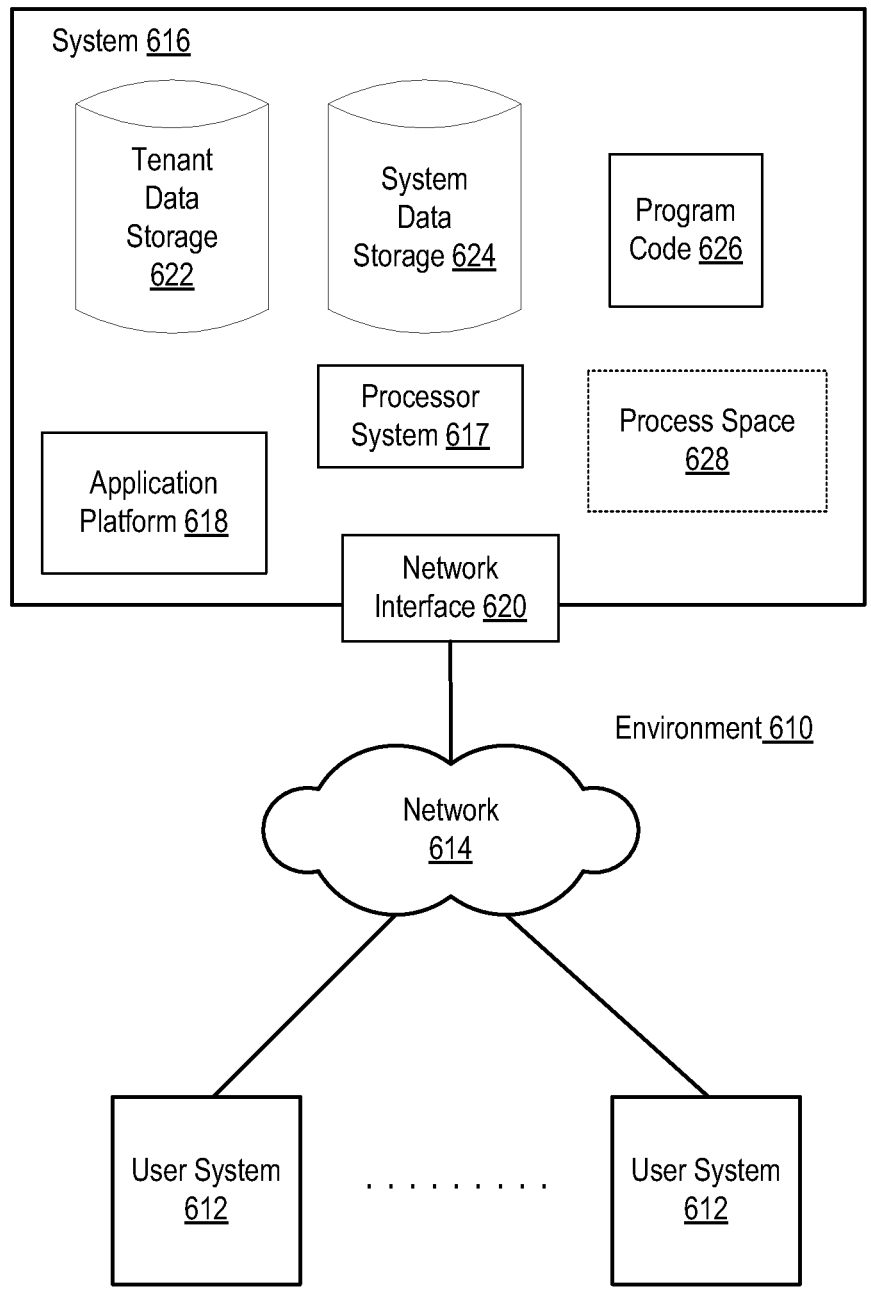
FIG. 6 illustrates a block diagram of an example of an environment in which an on-demand database service might be used.

FIG. 6 illustrates a block diagram of an example of an environment 610 in which an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s).

Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 may include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Google's Chrome browser, Microsoft's Internet Explorer browser, Opera's browser, or a mobile browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
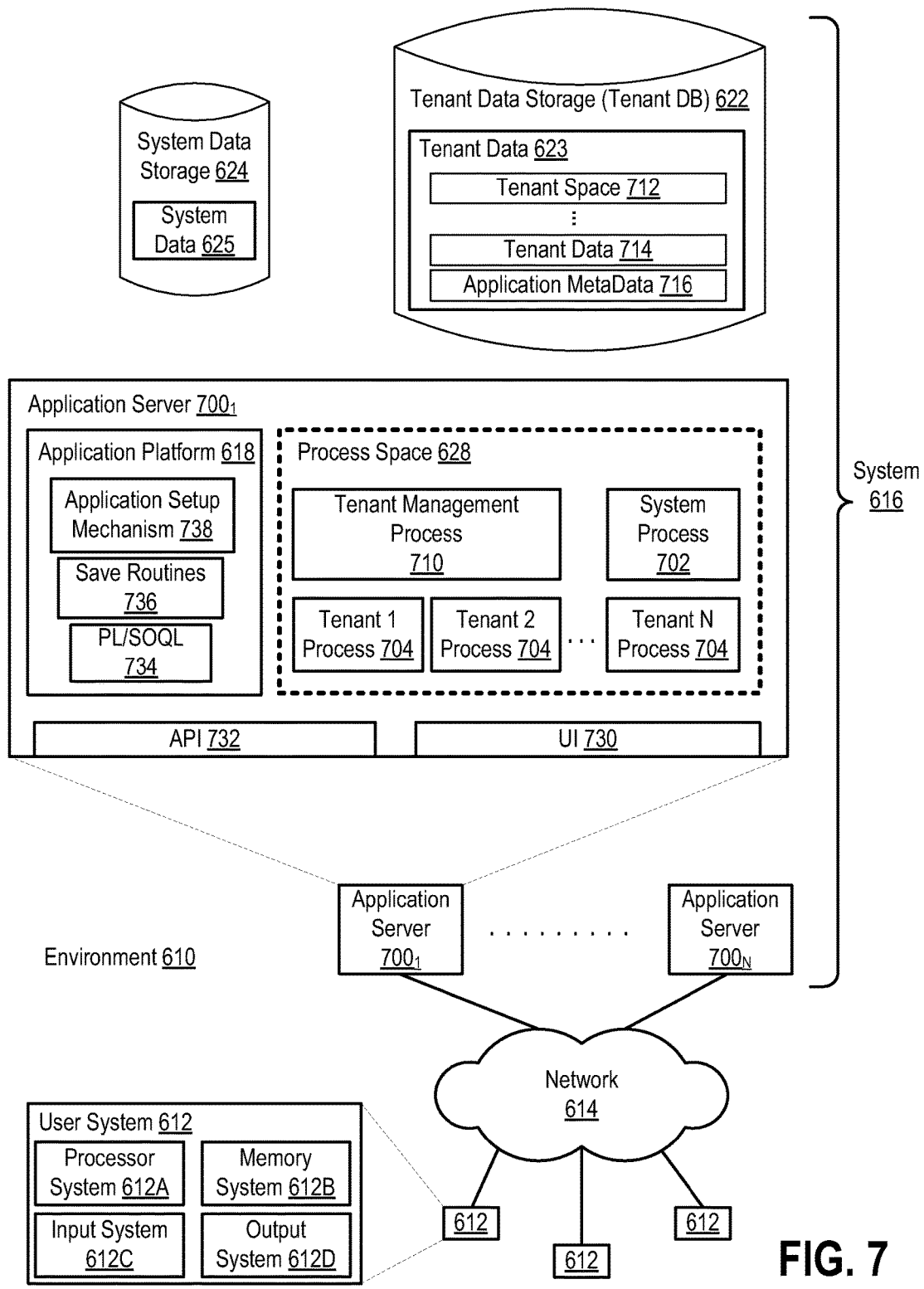
FIG. 7 illustrates a block diagram of an embodiment of elements of FIG. 6 and various possible interconnections between these elements.

FIG. 7 illustrates a block diagram of an embodiment of elements of FIG. 6 and various possible interconnections between these elements. FIG. 7 also illustrates environment 610. However, in FIG. 7, the elements of system 616 and various interconnections in an embodiment are further illustrated. FIG. 7 shows that user system 612 may include a processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 700₁-700ₙ, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 700₁ might be coupled via the network 614 (e.g., the Internet), another application server 700ₙ₋₁ might be coupled via a direct network link, and another application server 700ₙ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:

executing a multi-tenant database system within a host organization in support of multiple distinct customer organizations which utilize on-demand cloud based services provided by the host organization, wherein the multi-tenant database system includes processors and memory which are shared amongst the multiple distinct customer organizations;

receiving, at a request interface, incoming requests from any of the multiple distinct customer organizations, each operating as a tenant of the multi-tenant database system, and returning responses to the multiple distinct customer organizations responsive to the incoming requests received;

storing protected data of the multiple distinct customer organizations within one or more database systems, wherein the one or more database systems having the protected data stored therein are accessible via a database query interface of the host organization;

wherein each one of the multiple distinct customer organizations are prohibited from submitting database queries to the one or more database systems which exceed the scope of one single customer organization's data corresponding to the respective customer organization's tenancy within the multi-tenant database system;

generating, by the processors, a plurality of messages for each of a first and subsequent distinct customer organizations and processing against the one or more database systems to perform metrics collection for each distinct customer organization separately and releasing the plurality of messages for processing against the one or more database systems specifying a common repository for the metrics collection output, wherein the plurality of messages are generated based on an inference of scope and granularity required to perform the metrics collection;

wherein the metrics collection output is stored within the common repository as aggregation data in a common pool, with each distinct customer organization's pooled data derived from the multi-tenant database and organized via a customer organization ID column identifying each respective customer organization;

wherein the aggregation data is abstracted from the protected data to eliminate exposure of any of the protected data of any of the multiple distinct customer organizations various customer organizations' underlying data records as stored within the one or more database systems; and receiving, via a metrics API, a cross-organizational query metrics query requesting results to be returned with data having a scope greater than a single one of the multiple distinct customer organization despite the prohibition against cross-organizational database queries, wherein the one or more database systems having the multiple distinct customer organizations' protected data stored therein are not accessible via the metrics API;

processing the cross-organizational query metrics query against the common repository and returning metrics query results from the common repository having metrics associated with multiple of the distinct customer organizations according to the customer organization ID column; and monitoring a workload of the host organization to prioritize real-time transaction requests over messages and associated parameters utilized to implement the metrics collection by releasing one or more of the plurality of messages for immediate processing when the workload of the host organization is below a threshold and processing the real-time transaction requests at the host organization concurrently with the released one or more messages and any associated parameters to implement the metrics collection.

2. The method of claim 1, further comprising:
scheduling a time for metrics collection from the one or more database systems;
releasing the plurality of messages for processing against the one or more database systems to perform metrics collection according to the time scheduled for metrics collection; and
capturing the metrics collection output as the aggregation data of the common repository.

3. The method of claim 1, wherein generating the plurality of messages comprises generating one or more messages and associated parameters to implement the metrics collection at the host organization, the metrics collection based on protected customer data stored within the one or more database systems.

4. The method of claim 1, further comprising:
triggering the metrics collection at a time previously scheduled, wherein triggering the metrics collection comprises at least (i) generating one or more messages and associated parameters to implement the metrics collection (ii) enqueuing the one or more messages and associated parameters for processing by the one or more database systems and releasing the generated one or more messages for processing against the one or more database systems to perform metrics collection for each tenant.

5. The method of claim 1, further comprising:
implementing metrics collection and generating the output based on selecting a granularity from one of plurality of granularities such as a per-user, a per-tenant, a per-organization, a per-node, per-partition, or a per-database granularity; and
scheduling the metrics collection utilizing the selected granularity and performing the metrics collection; and
processing metrics collection in parallel with any of the plurality of the granularities.

6. The method of claim 1:
wherein the output captured via the common repository is associated with the customer organization ID column identifying which one among a plurality of customer organizations of the host organization is associated with any metric, statistic, or metadata present within the metrics collection output captured by the common repository; and wherein returning the metrics query results from the common repository comprises returning the metrics query results from the common repository having metrics, statistics, and/or metadata associated with multiple customer organizations organized according to the customer organization ID column.

7. The method of claim 1:
wherein users of the host organization are restricted to metrics queries having a query scope that is limited to a single individual customer organization to which the user belongs; and
wherein system administrators of the host organization are enabled to perform metrics queries having a query scope that exceeds a single individual customer organization via a restricted administrative interface for the system administrators which submits metrics queries against the common repository via the metrics API.

8. The method of claim 1:
wherein the protected data include at least one of HIPAA (Health Insurance Portability and Accountability Act) protected data; Sarbanes-Oxley Act (SOX) protected data; proprietary sales data; proprietary financial data; proprietary trade-secret data; and government classified data; and
wherein the aggregation data is void of the protected data and includes metadata, metrics, and statistics.

9. The method of claim 1, further comprising:
scheduling a time for metrics collection by scheduling a metrics collection job at a specified periodicity; and
wherein processing the metrics collection against the one or more database systems comprises iterating the metrics collection at the specified periodicity selected from one of a daily periodicity, a weekly periodicity, a bi-weekly periodicity, a monthly periodicity, a quarterly periodicity, and a yearly periodicity.

10. Non-transitory computer readable storage media having instructions stored thereon that, when executed by a processor of a system, the instructions cause the system to perform operations comprising:
executing a multi-tenant database system within a host organization in support of multiple distinct customer organizations which utilize on-demand cloud based services provided by the host organization, wherein the multi-tenant database system includes processors and memory which are shared amongst the multiple distinct customer organizations;
receiving, at a request interface, incoming requests from any of the multiple distinct customer organizations, each operating as a tenant of the multi-tenant database system, and returning responses to the multiple distinct customer organizations responsive to the incoming requests received;
storing protected data of the multiple distinct customer organizations within one or more database systems, wherein the one or more database systems having the protected data stored therein are accessible via a database query interface of the host organization;
wherein each one of the multiple distinct customer organizations are prohibited from submitting database queries to the one or more database systems which exceed the scope of one single customer organization's data corresponding to the respective customer organization's tenancy within the multi-tenant database system;

generating, by the processors, a plurality of messages for each of a first and subsequent distinct customer organizations and processing against the one or more database systems to perform metrics collection for each distinct customer organization separately and releasing the plurality of messages for processing against the one or more database systems specifying a common repository for the metrics collection output, wherein the plurality of messages are generated based on an inference of scope and granularity required to perform the metrics collection;

wherein the metrics collection output is stored within the common repository as aggregation data in a common pool, with each distinct customer organization's pooled data derived from the multi-tenant database and organized via a customer organization ID column identifying each respective customer organization;

wherein the aggregation data is abstracted from the protected data to eliminate exposure of any of the protected data of any of the multiple distinct customer organizations various customer organizations' underlying data records as stored within the one or more database systems; and receiving, via a metrics API, a cross-organizational query metrics query requesting results to be returned with data having a scope greater than a single one of the multiple distinct customer organization despite the prohibition against cross-organizational database queries, wherein the one or more database systems having the multiple distinct customer organizations' protected data stored therein are not accessible via the metrics API;

processing the cross-organizational query metrics query against the common repository and returning metrics query results from the common repository having metrics associated with multiple of the distinct customer organizations according to the customer organization ID column; and monitoring a workload of the host organization to prioritize real-time transaction requests over messages and associated parameters utilized to implement the metrics collection by releasing one or more of the plurality of messages for immediate processing when the workload of the host organization is below a threshold and processing the real-time transaction requests at the host organization concurrently with the released one or more messages and any associated parameters to implement the metrics collection.

11. The non-transitory computer readable storage media of claim 10:

wherein the output captured via the common repository is associated with the customer organization ID column identifying which one among a plurality of customer organizations of the host organization is associated with any metric, statistic, or metadata present within the metrics collection output captured by the common repository; and wherein returning the metrics query results from the common repository comprises returning the metrics query results from the common repository having metrics, statistics, and/or metadata associated with multiple customer organizations organized according to the customer organization ID column.

12. The non-transitory computer readable storage media of claim 10, wherein the instructions cause the system to perform operations further comprising:

scheduling a time for metrics collection by scheduling a metrics collection job at a specified periodicity; and wherein processing the metrics collection against the one or more database systems comprises iterating the metrics collection at the specified periodicity selected from one of a daily periodicity, a weekly periodicity, a bi-weekly periodicity, a monthly periodicity, a quarterly periodicity, and a yearly periodicity.

13. The non-transitory computer readable storage media of claim 10:

wherein users of the host organization are restricted to metrics queries having a query scope that is limited to a single individual customer organization to which the user belongs; and wherein system administrators of the host organization are enabled to perform metrics queries having a query scope that exceeds a single individual customer organization via a restricted administrative interface for the system administrators which submits metrics queries against the common repository via the metrics API.

14. The non-transitory computer readable storage media of claim 10, wherein the instructions cause the system to perform operations further comprising:

scheduling one or more messages and associated parameters to implement metrics collection via a bulk processing database call; and capturing the metrics collection output into the common repository by specifying a BULK COLLECT INTO call for the processing and specifying the common repository as a target repository for the metrics collection output.

15. The non-transitory computer readable storage media of claim 10:

wherein the protected data include at least one of HIPAA (Health Insurance Portability and Accountability Act) protected data; Sarbanes-Oxley Act (SOX) protected data; proprietary sales data; proprietary financial data; proprietary trade-secret data; and government classified data; and wherein the aggregation data is void of the protected data and includes metadata, metrics, and statistics.

16. A system comprising:

a multi-tenant database system to execute within a host organization in support of multiple distinct customer organizations which utilize on-demand cloud based services provided by the host organization, wherein the multi-tenant database system includes processors and memory which are shared amongst the multiple distinct customer organizations;

a request interface to receive incoming requests from any of the multiple distinct customer organizations, each operating as a tenant of the multi-tenant database system, and returning responses to the multiple distinct customer organizations responsive to the incoming requests received;

one or more databases for storing protected data of the multiple distinct customer organizations within one or more database systems, wherein the one or more database systems having the protected data stored therein are accessible via a database query interface of the host organization;

wherein each one of the multiple distinct customer organizations are prohibited from submitting database queries to the one or more database systems which exceed the scope of one single customer organization's data corresponding to the respective customer organization's tenancy within the multi-tenant database system;

a scheduler module for generating a plurality of messages for each of a first and subsequent distinct customer organizations and processing against the one or more database systems to perform metrics collection for each distinct customer organization separately and releasing the plurality of messages for processing against the one or more database systems specifying a common repository for the metrics collection output, wherein the plurality of messages are generated based on an inference of scope and granularity required to perform the metrics collection;

wherein the metrics collection output is stored within the common repository as aggregation data in a common pool, with each distinct customer organization's pooled data derived from the multi-tenant database and organized via a customer organization ID column identifying each respective customer organization;

wherein the aggregation data is abstracted from the protected data to eliminate exposure of any of the protected data of any of the multiple distinct customer organizations various customer organizations' underlying data records as stored within the one or more database systems; and a metrics Application Programming Interface (API) for receiving, via a metrics API, a cross-organizational query metrics query requesting results to be returned with data having a scope greater than a single one of the multiple distinct customer organization despite the prohibition against cross-organizational database queries, wherein the one or more database systems having the multiple distinct customer organizations' protected data stored therein are not accessible via the metrics API;

a message handler for processing the cross-organizational query metrics query against the common repository and returning metrics query results from the common repository having metrics associated with multiple of the distinct customer organizations according to the customer organization ID column; and wherein the system is to monitor a workload of the host organization to prioritize real-time transaction requests over messages and associated parameters utilized to implement the metrics collection by releasing one or more of the plurality of messages for immediate processing when the workload of the host organization is below a threshold and processing the real-time transaction requests at the host organization concurrently with the released one or more messages and any associated parameters to implement the metrics collection.

17. The system of claim 16:
wherein the scheduler is to further schedule a time for metrics collection from the one or more database systems;
wherein the scheduler is to further release the plurality of messages for processing against the one or more database systems to perform metrics collection according to the time scheduled for metrics collection; and
wherein the metrics API is to further capture the metrics collection output as the aggregation data of the common repository.

18. The system of claim 16:
wherein the scheduler is to further generate one or more messages and associated parameters to implement the metrics collection at the host organization, the metrics collection based on protected customer data stored within the one or more database systems.

19. The system of claim 16:
wherein the scheduler is to further trigger the metrics collection at a time previously scheduled, by (i) generating one or more messages and associated parameters to implement the metrics collection (ii) enqueuing the one or more messages and associated parameters for processing by the one or more database systems and releasing the generated one or more messages for processing against the one or more database systems to perform metrics collection for each tenant.

20. The system of claim 16:
wherein the metrics API is to further determine a granularity and scope required to implement metrics collection and generate the output, the granularity being selected from one of a plurality of granularities such as a per-user, a per-tenant, a per-organization, a per-node, per-partition, or a per-database granularity; and
wherein the scheduler is to further process the metrics collection in parallel with any of the plurality of the granularities.

21. The system of claim 16:
wherein the output captured via the common repository is associated with the customer organization ID column identifying which one among a plurality of customer organizations of the host organization is associated with any metric, statistic, or metadata present within the metrics collection output captured by the common repository; and
wherein the message handler is to further return the metrics query results from the common repository having metrics, statistics, and/or metadata associated with multiple customer organizations organized according to the customer organization ID column.

22. The system of claim 16:
wherein users of the host organization are restricted to metrics queries having a query scope that is limited to a single individual customer organization to which the user belongs; and
wherein system administrators of the host organization are enabled to perform metrics queries having a query scope that exceeds a single individual customer organization via a restricted administrative interface for the system administrators which submits metrics queries against the common repository via the metrics API.

23. The system of claim 16:
wherein the scheduler is to further schedule a metrics collection job at a specified periodicity and iterate the metrics collection at the specified periodicity selected from one of a daily periodicity, a weekly periodicity, a bi-weekly periodicity, a monthly periodicity, a quarterly periodicity, and a yearly periodicity.

24. The system of claim 16:
wherein the scheduler is to further implement metrics collection via a bulk processing database call and capture the metrics collection output into the common repository by specifying a BULK COLLECT INTO call for the processing and specifying the common repository as a target repository for the metrics collection output.

25. The system of claim 16:
wherein the protected data include at least one of HIPAA (Health Insurance Portability and Accountability Act) protected data; Sarbanes-Oxley Act (SOX) protected data; proprietary sales data; proprietary financial data; proprietary trade-secret data; and government classified data; and wherein the aggregation data is void of the protected data and includes metadata, metrics, and statistics.

* * * * *